(12) United States Patent
Lewis et al.

(10) Patent No.: US 6,760,099 B1
(45) Date of Patent: Jul. 6, 2004

(54) SUN METER AND METHOD OF OPERATION

(75) Inventors: Joseph D. Lewis, Suite 405 One Northgate Plz., Chattanooga, TN (US) 37415; William Street, Kiel, WI (US); Al Alfers, Reno, NV (US)

(73) Assignee: Joseph D. Lewis, Hixson, TN (US)

( * ) Notice: Subject to any disclaimer, the term of this patent is extended or adjusted under 35 U.S.C. 154(b) by 236 days.

(21) Appl. No.: 10/106,956

(22) Filed: Mar. 26, 2002

(51) Int. Cl.[7] .................................................. G01J 1/42
(52) U.S. Cl. ........................................ 356/218; 356/226
(53) Field of Search ................................ 356/218, 226, 356/227

(56) References Cited

U.S. PATENT DOCUMENTS 6,114,687 A * 9/2000 Sharp et al. .......... 250/214 AL

* cited by examiner

*Primary Examiner*—F. L. Evans
(74) *Attorney, Agent, or Firm*—Stephen J. Stark; Miller & Martin PLLC

(57) ABSTRACT

A sun meter having a processor receiving a signal from a photocell. The processor first compares the signal to a first threshold to determine if it is daytime. If it is daytime, the processor then compares the signal to a second threshold to determine if the signal is greater than a value selected to correspond with direct sunlight. If the signal is greater than the second threshold, a counter counts. For each day of use, the amount of time of direct sun is tallied and may be displayed. An average amount of direct sun for a period of days may also be displayed. It is anticipated that a plurality of meters will be utilized in a specific area to determine the specific locations which receive the most direct sunlight and then know what plants will thrive and where to place such plants.

14 Claims, 3 Drawing Sheets

SUN METER AND METHOD OF OPERATION

BACKGROUND OF THE INVENTION

The present invention relates to measuring devices utilized to measure and record the amount of time during a day that direct sun light strikes a sensor, and more particularity to sun meters and a method of utilizing a plurality of meters to determine specific locations in a given area that receive relatively more direct sun light than others and the quantities received of direct sun light at each location.

A number of devices have been developed which utilize light sensors, including photoresistive elements. U.S. Pat. No. 4,015,116 shows a device which measures the total solar radiation over a given time. While this device may be useful for some applications, it does not teach or suggest a way to record direct sun striking a sensor for a given time.

U.S. Pat. No. 4,110,049 discloses a radiation measuring device for recording radiation levels on a graph with time as an axis of the graph and intensity as a second axis. FIG. 6 of the '049 patent shows a graphical display of a hypothetical cloudy day. It would be difficult to determine the amount of direct sun upon a sensor based upon this graph. Furthermore, there is no teaching that such a determination should be made.

U.S. Pat. No. 4,161,124 shows a solar energy measuring device that measures the total amount of solar energy received in a given time period utilizing a frequency generated by a frequency controlled-frequency oscillator which alter frequency according to the strength of light impacting upon the sensor.

U.S. Pat. No. 4,218,139 shows a device which measures and displays the total solar energy impacting a sensor cell in a given period by counting pulses in an electrical pulse train.

U.S. Pat. No. 4,609,288 shows a device which measures the strength of the radiation from the sun at a specific point in time.

U.S. Pat. No. 5,784,303 shows a light sensing device having a sampling signal generator and a measuring device wherein the sampling signal is utilized when not measuring the light.

U.S. Pat. Nos. 5,717,487 and 6,107,998 show devices utilized to obtain information to orient sensor cells relative to a light source to maximize the effectiveness of the sensor cells.

Most, or all, of these prior art devices utilize light sensors. Typical light sensors allow current to flow through them proportional to the amount of light they receive. For full sun, some light sensors provide a relatively high voltage. At other daylight conditions, the voltage will be less than at full sun. In no light situations, the light sensor records low voltage and some light sensors may even turn themselves off. Some light sensors operate utilizing solar energy. Others operate utilizing a more traditional power source. Newark Electronics offers a plurality of these type sensors in their current catalogue at page 570, as well as on their website at www.newark.com.

Although devices utilizing sensors have been developed in the prior art which measure the strength of sunlight and record the strength of sunlight over time, there is not believed to have been any effort undertaken to measure the time, or average time during a set period, of direct sunlight upon a particular location. This information is believed to be helpful to determine what types of plants will thrive at a specific location. Furthermore, there is not believed to have been any effort to determine within a specific area, the locations which receive relatively more direct sun than others and the quantities of direct sunlight received.

SUMMARY OF THE INVENTION

Consequently, it is a primary object of the present invention to provide a sun meter which measures the time of direct sunlight striking a sensor in a single day.

It is another object of the invention to provide a meter capable of determining an average daily amount of direct sun striking a sensor over a period of days.

It is a further object of the present invention to provide a meter configured to store the amount of direct sun light received for a number of days for display to and/or recall by a user.

It is still a further object of the invention to provide a method of utilizing a plurality of sun meters adapted to measure the amount of time of direct sun received in a given period, or average daily direct sun, in order to determine the location(s) of relative more direct sun in a given area as well as the amount of direct sunlight at the location(s).

It is a further object of the invention to provide a meter capable of having multiple preset thresholds to compare to day/night light thresholds as well as to provide a pre-set direct sun value threshold for evaluating whether and how much direct sunlight is received during a daytime period.

Accordingly, the present invention provides at least one, and preferably, a plurality of sun meters and method of their use. The sun meter(s) includes a light sensor which measures the amount of light striking the sensor. Upon activation, if the light striking the meter reaches a first pre-set threshold corresponding to direct sunlight, the meter counts the time. If the light striking the meter is below the first pre-set level, the meter does not count the time. If the light striking the meter is below a second pre-set level corresponding to night, the meter enters a night mode. A microprocessor counts the time above the first pre-set level for each day and stores the daily amount of direct sun light.

Once the meter(s) have been in position for a desired length of time, the meters may be read. The meters preferably record the amount of time, such as the number of hours, of direct sunlight for each day the meter(s) were activated. Furthermore, the meters preferably track the average amount of direct sun light since the activation of the meter.

When utilizing multiple sensors or meters, various locations in a given area may be evaluated to determine which locations receive relatively more direct sun than others. This information has been found to assist in determining the types of plants which will flourish in particular locations in the given area.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
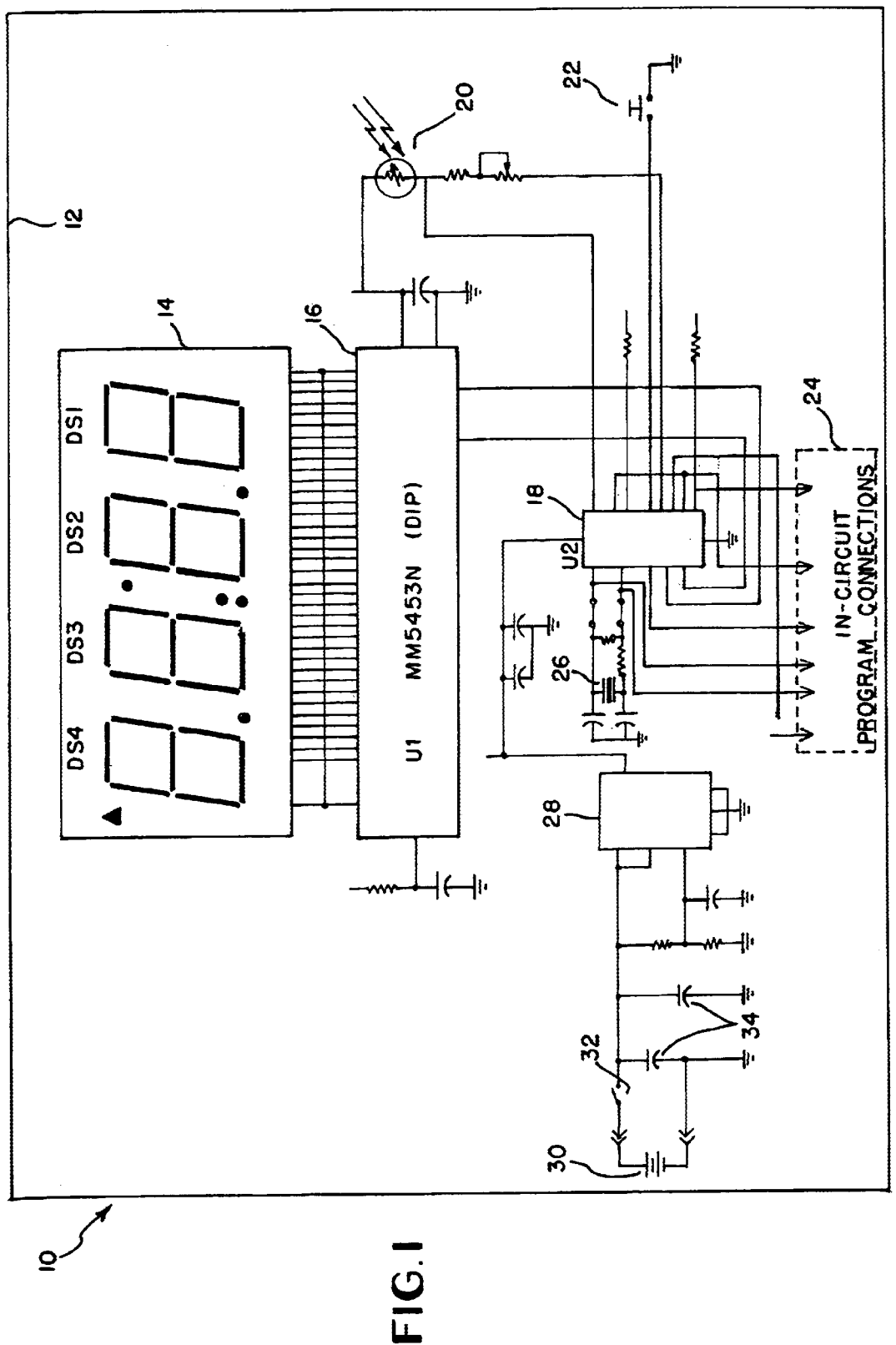
FIG. 1 is a schematic representation of the electronics of the sun meter constructed in accordance with the principles of the present invention.

FIG. 1 shows a presently preferred schematic representation of the electrical circuitry of a sun meter 10. The meter 10 is located within housing 12 which could be any suitable enclosure. It is preferred that the housing 12 be at least somewhat waterproof to protect electronic components located therein from the weather.

Within the housing 12, or connected to the housing 12, is a display 14. The display 14 is preferably visible from external to the housing 12. The display 14 illustrated is a digital display such as a liquid crystal display (LCD). The display 14 is driven by a driver 16, such as an LCD driver. A processor 18 is connected to the driver 16.

The processor 18 illustrated is a microprocessor in the form of a chip which receives input from a photocell 20, a switch 22, programming connections 24, a counter 26, and a power provider 28. The processor 18 outputs to the driver 16 which operates the display 14. Motorola makes the processor chip utilized in the preferred embodiment. The part number is MC68HC 908KX2CDW. The photocell 20 is a light sensor made by Pereln and is part number VT43N3. These are essentially off-the-shelf components along with the remainder of the circuitry utilized in the meter.

The power provider 28 is illustrated as a voltage regulator which is driven by battery 30 when switch 32 is in the "on" position. When switch 32 is in the "off" position, no power is provided to the power provider 28 from the battery 30 to then drive the processor 18 or the display 14. Capacitors 34 may temporarily provide some power to the power provider 28, and assist the voltage regulator in maintaining a constant voltage output from the voltage regulator.

Although only two switches 22, 32 are provided in the illustration of FIG. 1, other switches 22 could be added if increased capabilities are desired for other embodiments.

Figure 2:
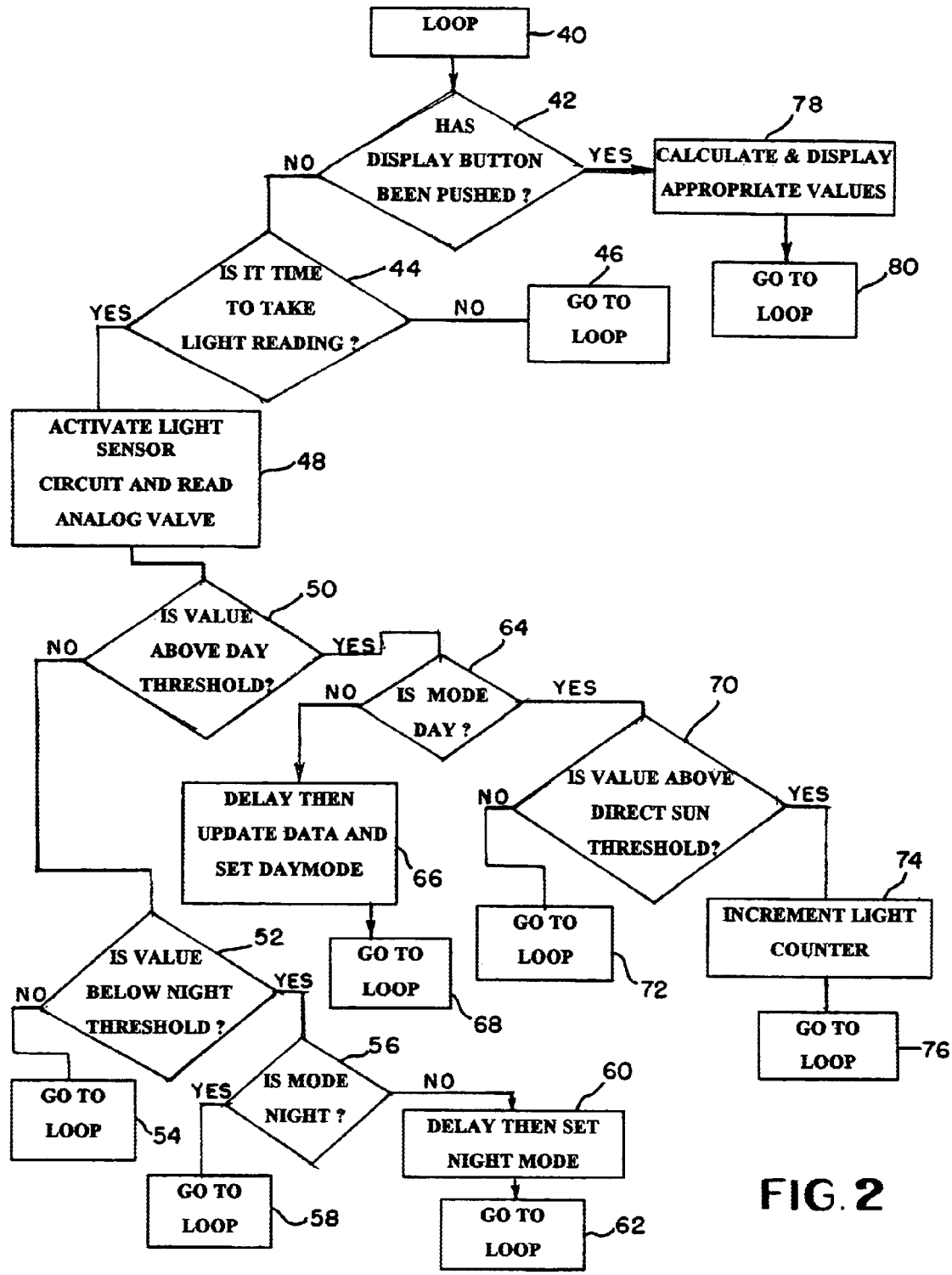
FIG. 2 is a flow chart of the logic process of the sun meter constructed in accordance with the principles of the present invention.

The processor 18 is programmable through the programming connections 24 to input a program, such as the program illustrated by the flow chart of FIG. 2.

While FIG. 1 is the preferred embodiment, it is possible in alternative embodiments that one or more photocells 14 would be a separate component from the meter 10 and connected by leads and or conduits to the meter 10 so that multiple photocells 14 could be utilized with a single meter 10 having the capability of processing multiple photocells 14. For instance, the meter 10 could receive multiple photocell inputs into one or more processors 18 and track and/or process data separately. Other components could attach to or detach from the meter including the power provider 28, the display 14, etc.

FIG. 2 shows the preferred flow of logic utilized by the meter 10 of FIG. 1. A loop begins at step 40. At step 42, a determination is made as to whether a display button has been pushed. If the display button has not been pushed, then a determination is made at step 44 as to whether or not it is time to take a light reading. If it is not time to take a light reading, then step 46 returns to the loop at step 44. If it is time to take a light reading then the process continues to step 48 where the light sensor circuit is activated, if not already, and an analog value is read which corresponds with a level of light intensity striking the light sensor, i.e., a signal, such as voltage is received from the photocell 20.

Upon reading the signal value at step 48, a determination is made at step 50 as to whether the value is above a day threshold. Above may mean greater in magnitude when the photocell 20 provides a maximum voltage or signal for full sun and a minimum voltage for no sun. Alternatively, if the photocell 20 provides a minimum signal for full sun and a maximum signal for no sun, then above will mean less than the threshold value. If the value at step 48 is below a preset day threshold, then the process continues to step 52 where a determination is made as to whether or not the value read at step 48 is below the night threshold. If the value read at step 48 is not below the preset night threshold, then step 54 returns to the loop at step 40.

If the value read at step 48 is below the night threshold, then a determination is made to calculate whether or not the MODE is set at NIGHT at step 56. If the MODE is set at NIGHT, then the process returns at step 58 to the loop at step 40. If the MODE is not set at NIGHT, then the process proceeds to step 60 where a delay occurs and the MODE is set to NIGHT. At step 62, the process returns to the loop at step 40. NIGHT and DAY are utilized by the processor to separate days from each other.

If the value taken at step 48 is determined at step 50 to be above the DAY threshold, then a determination is made at step 64 as to whether the MODE is DAY. If the MODE is not DAY, then at step 66, a delay occurs and the MODE is set to DAY. The process then continues to step 68 to return to loop at step 40. If the determination made at step 64 determines that the MODE is DAY, then a determination is made at step 70 as to whether the value read at step 48 is above a direct sun threshold. If the value at step 48 is not above the direct sun threshold, which is preferably preset, then at step 72 the process returns to loop at step 40. If the value at step 48 is above the direct sun threshold, then at step 74 a counter in the processor is incremented at the process returns to loop at step 76. The day threshold corresponds with a minimum amount of light qualifying as direct sunlight striking the photocell 20. Of course, the sensor could provide a signal above the direct sunlight value in certain circumstances.

At some point, a user will decide to take a reading at step 42. When a reading is taken at step 78, the processor or other appropriate component calculates, i.e., tabulates or displays the counter value from step 74 for each particular day of stored data. Days are determined by the intervals between the DAY and NIGHT MODES. Days could alternatively be determined with a clock. Furthermore using a simple averaging calculation, the processor may provide an average daily direct sun amount. The display values at step 78 are preferably in terms of hours and minutes, but any other appropriate format may be utilized. After displaying values as output data at step 78, the values may be reset or returned at step 80 to loop at step 40.

A number of alternative embodiments may be created this basic logic and apparatus. For instance, if multiple remote sensors are utilized for a single meter, the process may run multiple loops 40 in a somewhat parallel relationship possibly with multiple sets of circuitry. Multiple display buttons may be utilized to display and/or calculate the time above a direct sun threshold so that one button corresponds with a particular day of the week or a particular button corresponds with the averaging feature.

In the presently preferred embodiment, a first push of the display button displays the last day of direct sun recorded, a second push of the display button displays the second to last day, etc. After seven pushes of the display button with each push corresponding with the days of the past week, an average is displayed on the eighth push. At the ninth push of the display button, the counter used in step 74 is reset. Other embodiments may utilize other inputs or utilize existing inputs in a different manner to display information or direct functions of the processor 18. Furthermore, other embodiments may display or store output data in other or more expensive ways.

Figure 3:
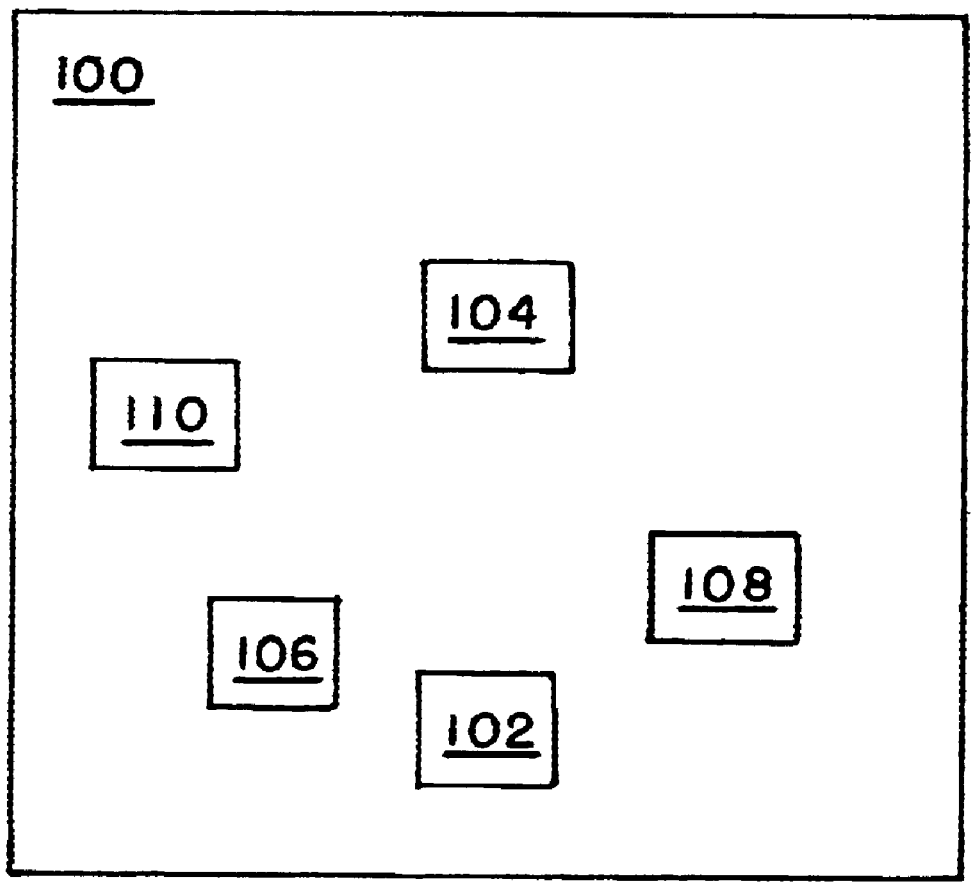
FIG. 3 is a diagramic representation of a plurality of sun meters placed in a given area.

FIG. 3 shows a preferred method of use of the meters 10. A plurality of meters represented by meters 102,104,106, 108, and 110 are shown in an area 100. The area 100 selected is preferably the yard of a homeowner or other appropriate area 100. The meters 102,104,106,108, and 110 are placed in different locations about the area 100. In this manner the amount of direct sun light for each of the locations where the meters 102,104,106,108 and 110 are placed may be determined so that particular plants may be selected which require, or at least prefer, particular amounts of direct sunlight. In this manner the plants which are selected and planted have a higher percentage chance of thriving in the area 100. This reduces the cost of replacement of plants which do not obtain the requisite amount of direct sunlight.

Various factors will determine the amount of direct sunlight received by a particular meter, but a principle factor is believed to be shade from objects around the meter. As the sun travels through the sky the objects proximate to the meter will cast a shadow which may obscure the meter from direct sunlight at various times during the day. This will directly affect the amount of direct sunlight recorded by the meter.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A sun meter comprising:
    a photocell;
    a processor in electrical communication with the photocell, said processor configured to receive an electrical signal from the photocell which varies with an intensity of light contacting the photocell, said processor programed to compare the signal from the photocell with a first threshold corresponding to daylight,
    if the signal is above the first threshold, then comparing the signal to a second threshold corresponding to direct sunlight,
    if the signal is above the second threshold, then incrementing a counter and storing counter data,
    said processor programmed to output data, said output data related to counter data; and
    a display electrically configured to display output data from the processor, said output data at least reflecting the amount of time of direct sunlight contacting the photocell in a period.

2. The sun meter of claim 1 wherein the signal from the photocell varies directly with the intensity of light contacting the photocell.

3. The sun meter of claim 1 further comprising a first input in communication with the processor, said first input providing an input signal which is received by the processor, and upon receipt of the first input, said processor outputs the output data to the display.

4. The sun meter of claim 1 further comprising a power source, said power source providing electrical power to at least the processor and the display.

5. The sun meter of claim 1 further comprising a housing containing at least the processor.

6. The sun meter of claim 5 wherein the housing is at least water resistant.

7. The sun meter of claim 5 wherein the photocell is connected to the housing and light is accessible to the photocell from external to the housing.

8. The sun meter of claim 1 wherein when the signal is above the first threshold, a magnitude of the signal is greater than a magnitude of the first threshold.

9. The sun meter of claim 8 wherein when the signal is above the second threshold, a magnitude of the signal is greater than a magnitude of the second threshold.

10. The sun meter of claim 1 wherein the processor compares the signal to a third threshold corresponding to night, and if the signal is under the third threshold, said processor processing a first figure corresponding to a total amount of direct sunlight for a first day period and retaining said first figure.

11. The sun meter of claim 10 wherein after the processor has retained the first figure, comparing the signal to the first threshold until the signal is above the first threshold, and when the third threshold is reached again, counting counter data for processing a second figure corresponding to a total amount of direct sunlight for a second day period and retaining said second figure.

12. The sun meter of claim 11 wherein the processor averages at least the first and second figures to provide an average figure corresponding to an average amount of direct sunlight over at least first and second day periods.

13. A method of utilizing a plurality of sun meters, each sun meter having a photocell, a processor in electrical communication with the photocell, said processor configured to receive an electrical signal from the photocell which varies with an intensity of light contacting the photocell, said processor programed to compare the signal from the photocell with a first threshold corresponding to daylight, if the signal is above the first threshold, then comparing the signal to a second threshold corresponding to direct sunlight, if the signal is above the second threshold, then incrementing a counter and storing counter data, said processor programmed to output data, said output data related to counter data, and a display electrically configured to display output data from the processor, said output data at least reflecting the amount of time of direct sunlight contacting the photocell in a period, said method comprising:
    placing a first sun meter at a first location in an area;
    placing a second sun meter at a second location in the area;
    allowing at least a period of time to expire;
    reading the display from the first and second sun meters; and
    comparing the amount of direct sun light received at each of the first and second locations based upon the output data provided by the first and second sun meters.

14. The method of claim 13 wherein the area is the yard of a homeowner.

* * * * *